United States Patent
Susarla et al.

(10) Patent No.: US 11,887,166 B1
(45) Date of Patent: Jan. 30, 2024

(54) METHODS AND SYSTEMS FOR GENERATING AND USING CONTENT ITEM LEADS

(71) Applicant: United Services Automobile Association (USAA), San Antonio, TX (US)

(72) Inventors: Suresh Chakravarthy Susarla, San Antonio, TX (US); Shanna Limas, San Antonio, TX (US); Leonard Funari, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/693,198

(22) Filed: Mar. 11, 2022

Related U.S. Application Data

(63) Continuation of application No. 15/783,948, filed on Oct. 13, 2017, now Pat. No. 11,315,151.

(60) Provisional application No. 62/413,580, filed on Oct. 27, 2016.

(51) Int. Cl.
| | |
|---|---|
| *G06Q 30/02* | (2023.01) |
| *G06Q 30/0251* | (2023.01) |
| *G06Q 30/0241* | (2023.01) |
| *H04L 67/306* | (2022.01) |
| *G06Q 50/00* | (2012.01) |

(52) U.S. Cl.
CPC ..... *G06Q 30/0271* (2013.01); *G06Q 30/0252* (2013.01); *G06Q 30/0255* (2013.01); *G06Q 30/0277* (2013.01); *G06Q 50/01* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 9,721,229 B1 * | 8/2017 | Hernandez | G06Q 10/101 |
| 9,886,700 B1 | 2/2018 | Allouche | |
| 11,315,151 B1 | 4/2022 | Susarla et al. | |
| 2010/0100398 A1 * | 4/2010 | Auker | G06Q 50/01 |
| | | | 705/4 |
| 2011/0225047 A1 | 9/2011 | Breed et al. | |
| 2011/0231230 A1 | 9/2011 | Christon et al. | |
| 2012/0245963 A1 * | 9/2012 | Peak | G06Q 50/01 |
| | | | 705/4 |

(Continued)

OTHER PUBLICATIONS

U.S. Appl. No. 62/413,580, filed Oct. 27, 2016, Methods and Systems for Generating and Using Content Item Leads.

(Continued)

*Primary Examiner* — David J Stoltenberg
(74) *Attorney, Agent, or Firm* — Perkins Coie LLP

(57) ABSTRACT

Methods and systems described in this disclosure can identify, from a social media listening device, content items posted by a plurality of users, where each of the content items is associated with a social handle. Each of the content items can be mapped to a user identifier associated with a user or a potential user of a service using the social handle. A subset of the mapped content items can be created by selecting the mapped content items that correspond to an event based on content. The mapped content items are then categorized based on the corresponding events in the content items. Service or product opportunity leads can be determined from the mapped and categorized content items.

20 Claims, 6 Drawing Sheets

(56) References Cited

U.S. PATENT DOCUMENTS

| | | | |
|---|---|---|---|
| 2013/0024290 A1 | 1/2013 | Berg et al. | |
| 2013/0282481 A1* | 10/2013 | Kent | G06Q 30/0251 705/14.49 |
| 2013/0325517 A1* | 12/2013 | Berg | G06Q 10/10 705/4 |
| 2014/0019544 A1* | 1/2014 | Palmert | H04L 51/52 709/204 |
| 2014/0304011 A1* | 10/2014 | Yager | G06Q 40/02 705/4 |
| 2015/0019305 A1* | 1/2015 | Gorawala | G06Q 10/10 705/14.4 |
| 2015/0127343 A1 | 5/2015 | Mullor et al. | |
| 2015/0170175 A1* | 6/2015 | Zhang | H04M 15/851 705/7.33 |
| 2015/0363804 A1* | 12/2015 | Hoyne | G06Q 30/0206 705/7.35 |
| 2016/0005083 A1 | 1/2016 | Anand | |
| 2016/0012465 A1 | 1/2016 | Sharp | |
| 2016/0179808 A1 | 6/2016 | Ferreira et al. | |
| 2016/0255139 A1 | 9/2016 | Rathod | |
| 2017/0032427 A1 | 2/2017 | Khilnani et al. | |
| 2018/0060902 A1* | 3/2018 | Allouche | G06Q 10/0639 |
| 2018/0336574 A1 | 11/2018 | Mohan et al. | |

OTHER PUBLICATIONS

U.S. Appl. No. 15/783,948, filed Oct. 13, 2017, Methods and Systems for Generating and Using Content Item Leads, U.S. Pat. No. 11,315,151, Apr. 26, 2022.

* cited by examiner

METHODS AND SYSTEMS FOR GENERATING AND USING CONTENT ITEM LEADS

CROSS-REFERENCE TO RELATED APPLICATIONS

This application is a continuation of U.S. patent application Ser. No. 15/783,948, filed Oct. 13, 2017, now allowed, which is a non-provisional of and claims priority to U.S. Provisional Application No. 62/413,580, filed Oct. 27, 2016, entitled "METHODS AND SYSTEMS FOR GENERATING AND USING CONTENT ITEM LEADS," both of which are hereby incorporated by reference in their entirety for all purposes.

TECHNICAL FIELD

Various embodiments of the present disclosure generally relate to social media. More specifically, various embodiments of the present disclosure relate to generating and using content item leads.

BRIEF DESCRIPTION OF THE DRAWINGS

Embodiments of the present disclosure will be described and explained through the use of the accompanying drawings, in which.

DETAILED DESCRIPTION

Figure 1:
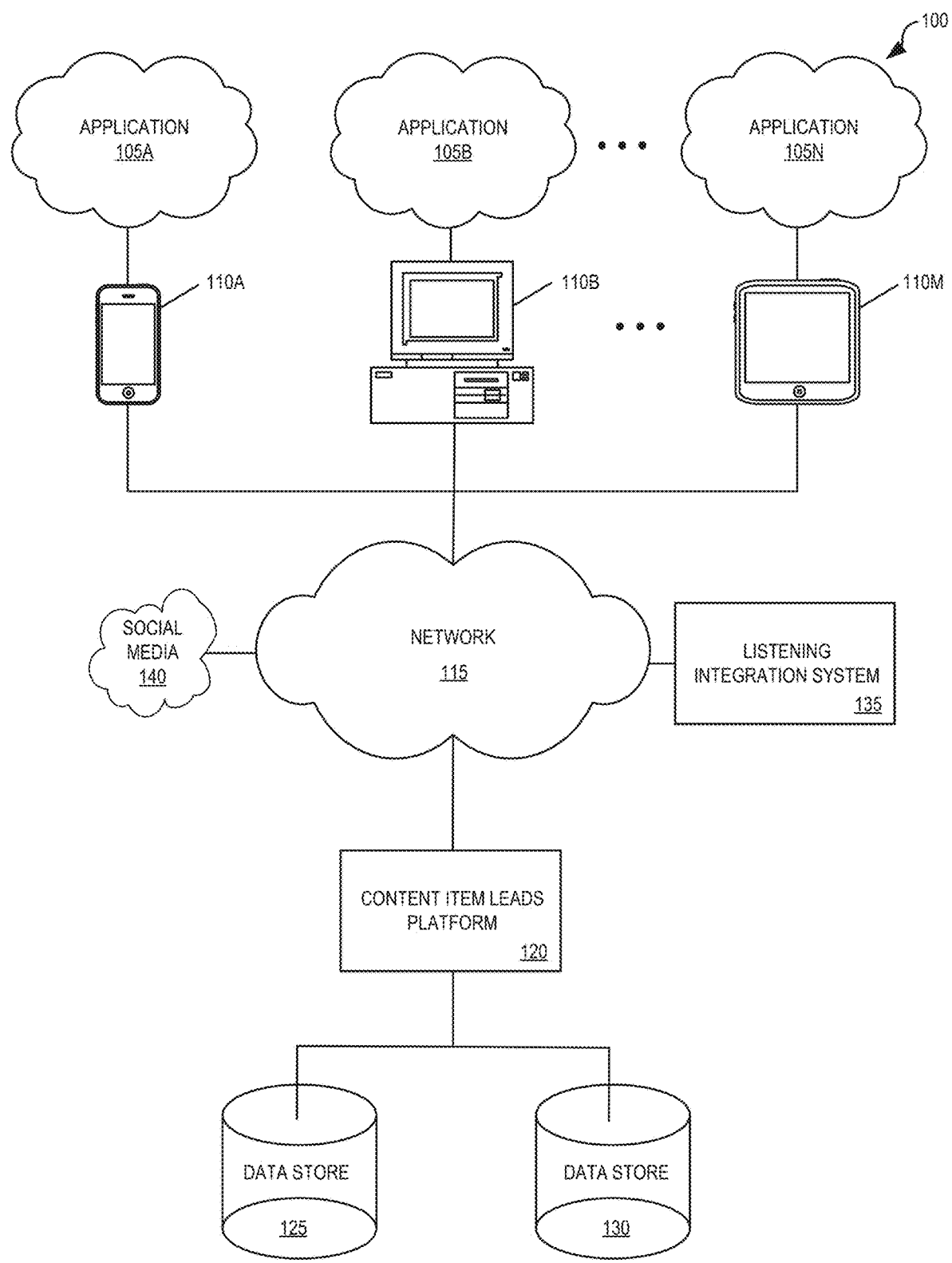
FIG. 1 illustrates an example of a network-based operating environment in accordance with various embodiments of the present disclosure.

Social media content is created and posted every second, and much of this content is public. This information can provide valuable insight into customers' and potential customers' needs and wants. However, such information is voluminous and must be processed and analyzed quickly to identify business leads in a timely manner.

Embodiments described herein provide a system and method to generate and use content leads from content items such as social media posts. For example, if a user posts that the user is looking for recommendations on SUVs, the user may benefit from services related to car buying (e.g., financing, insurance, price checking). To generate and use this content item lead (or "lead"), the content items have to be collected, filtered, and analyzed. A lead can be an identified opportunity to provide a service or product to a user.

Social listening devices can collect content items such as social media posts in real time or near real time and provide these content items to an organization. Each content item can be stored and associated with an article identifier that identifies the content item for tracking purposes. The content items can be matched to users of the organization using social handles. That is, each content item is associated with a social handle (i.e., an identifier of who posted the content item), and the users are associated with the social handles as well. Thus, users (e.g., users, potential users, members, customers, potential customers) can be matched with content items. The content items that are mapped to users can be further filtered by content. For example, the system may identify content items that are related to certain events (e.g., buying or selling a home). These content items can be categorized into different events.

A reference to each of the mapped categorized content items can be stored in a database. The reference can include, for example, the article identifier, a user identifier, a link to the content, the category of the content, a date it was posted, and/or where it was posted. The reference to the content item can be used, in combination with other information about the user, to determine whether the content item is a lead that requires follow-through (e.g., call to the user, email to the user, communication on a website). If so, the lead and/or action is sent to the appropriate channel.

Embodiments further provide methods and systems to determine the effectiveness of generating and using content items to determine leads. This can be done by tracking the actions taken by identifying the leads and determining via the article identifier whether a positive response was received (e.g., a user was called regarding their upcoming car purchase identified by a social media post, and the user decided to purchase the company's insurance, an assessor was sent to a home that potentially sustained damage when a catastrophe occurred and the user filed a property and casualty claim).

This disclosure describes systems and methods designed to generate and use content leads from content items. Various embodiments may provide one or more of the following technological improvements: (1) increased efficiency in filtering large amounts of social media data; (2) improved accuracy in identifying user's life events in near real time; (3) increased accuracy in identifying leads and providing relevant marketing materials or services to those in need; and (4) an efficient manner of determining effectiveness of identified leads.

In the following description, numerous specific details are set forth to provide a thorough understanding of embodiments of the present disclosure. However, it will be apparent to one skilled in the art upon reading the disclosure that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, read-only memories (ROMs), random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to third party 135, content item leads platform 120, social media 140, listening integration systems 135, and data stores 125 and 130.

Computing devices 110A-110M may be configured to communicate via network 115 with social media 140 and content item leads platform 120. In some embodiments, computing devices 110A-110M can retrieve or submit information to social media 140 and content item leads platform 120 and run one or more applications with customized content retrieved by content item leads platform 120 and data stores 125 and 130. For example, computing devices 110A-110M can execute a browser application or a customized client to enable interaction between the computing devices 110A-110M, social media 140, content item leads platform 120, and data stores 125 and 130.

Network 115 can be any combination of local area and/or wide area networks using wired and/or wireless communication systems. Network 115 can be or could use any one or more protocols/technologies: Ethernet, IEEE 802.11 or Wi-Fi, worldwide interoperability for microwave access (Wi MAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP), and/or file transfer protocol (FTP). Data exchanged over network 115 may be represented using technologies, languages, and/or formats including hypertext markup language (HTML), or extensible markup language (XML). In addition, all or some links can be encrypted using conventional encryption technologies such as secure sockets layer (SSL), transport layer security (TLS), and Internet Protocol Security (IPSec).

Content item leads platform 120 can run on one or more servers and can be used to receive content items associated with social handles from various services or systems such as listening integration system 135, determine social handles for users, match user identifiers with content items using the social handles, create a subset of mapped content items based on content, categorize the content items based on events identified in the content, determine which content items are leads, store the content items and/or portions of the content items in one or more databases, route the leads to a channel for one or more actions, store profiles and/or policies in data stores 125 and 130, and/or perform other activities. In some embodiments, content item leads platform 120 includes various data processing and analytic tools that allow it to generate and use content item leads from voluminous amounts of content items. In some embodiments, content item leads platform 120 is a server.

Content item leads platform 120 may be communicably coupled with listening integration system 135, social media 140, data stores 125 and 130, and computing devices 110A-110M, and may communicate, access, or receive data (e.g., social media) from social media 140, listening integration system 135, computing devices 110A-110M, and data stores 125 and 130. Content item leads platform 120 may be associated with a membership organization, and the users may be members of the membership organization.

Content item leads platform 120 may be customized or calibrated by individual companies or service providers based on user needs and/or business objectives. For example, companies may have different business rules regarding what qualifies as an event, how leads are determined, and how leads should be channeled and addressed.

Data stores 125 and 130 can be used to manage storage and access to user data such as user profiles, social handles, website or mobile application search history, account information, registered devices, user preferences, location information, security questions and answers, recent purchases, recent interactions with an organization, and other information. Data stores 125 and 130 may be data repositories of a set of integrated objects that are modeled using classes defined in database schemas. Data stores 125 and 130 may further include flat files that can store data. Content item leads platform 120 and/or other servers may collect and/or access data from data stores 125 and 130.

Social media 140 can be any type of social media where content items are created. Content items can include Facebook posts, Twitter tweets, Flickr posts, blog posts, YouTube comments, YouTube videos, and Pinterest posts. Content items can be associated with a social handle (i.e., an identifier of the person who posted the content).

Listening integration system 135 may be any type of system or service that assists with the collection of content items in social media 140. Listening integration system 135 can collect public content items in real time or near real time. In some embodiments, listening integration system 135 is a third party who provides the content items to an organization.

Figure 2:
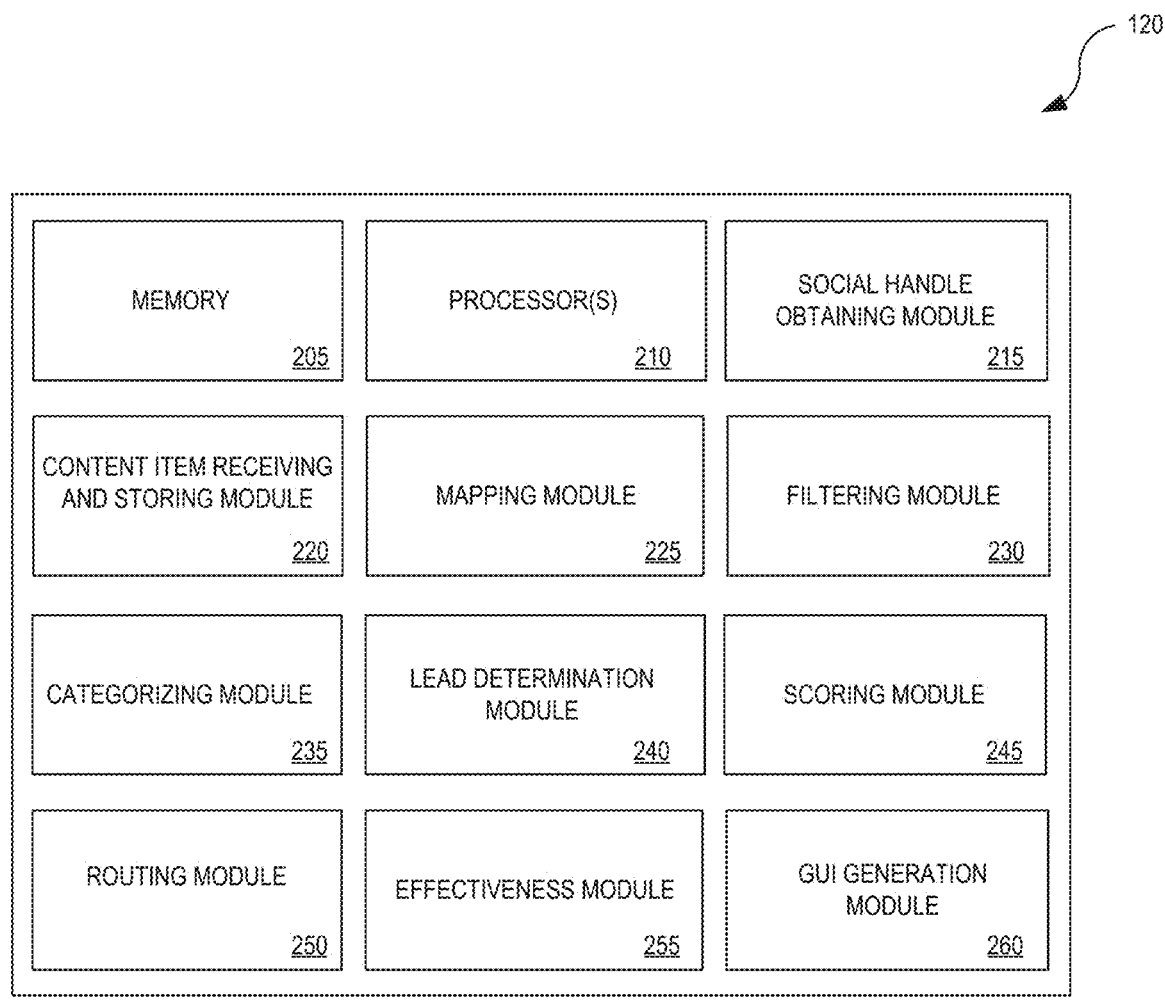
FIG. 2 illustrates various components of a content item leads platform that may be used in accordance with one or more embodiments of the present disclosure.

FIG. 2 illustrates a set of components within content item leads platform 120 according to one or more embodiments of the present disclosure. According to the embodiments shown in FIG. 2, content item leads platform can include memory 205, processor(s) 210, social handle obtaining module 215, content item receiving and storing module 220, mapping module 225, filtering module 230, categorizing module 235, lead determination module 240, scoring module 245, routing module 250, effectiveness module 255, and graphical user interface (GUI) generation module 260. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory (RAM), memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), double data rate random-access memory (DDR RAM), small outline dual inline memory modules (SODIMMs), EPROM, EEPROM, compact discs, DVDs, and/or the like. In accordance with some embodiments, memory 205 may include one or more disk drives or flash drives; one or more databases; one or more tables; or one or more files, local cache memories, processor cache memories, relational databases, flat databases; and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of social handle obtaining module 215, content item receiving and storing module 220, mapping module 225, filtering module 230, categorizing module 235, lead determination module 240, scoring module 245, routing module 250, effectiveness module 255, and GUI generation module 260.

Social handle obtaining module 215 can obtain social handles for users or potential users of a service or product of an organization. A social handle is a social media nickname that is unique to a user for a service. A user can have a different social handle for each different social media service (e.g., a Facebook social handle may be different than a Twitter social handle). Social handles can be obtained by asking a user for his/her social handle(s) or can be harvested by requesting the social handles from a third party. The third party may require information such as an email address and/or phone number, typically in an encrypted format. Once the social handles are obtained, social handle obtaining module 215 stores the social handles in a user profile associated with the user. In some embodiments, the social handles for each user are associated with a user identifier that is also stored in the user profile. When the user provides the social handle to an organization, the user's account is typically updated to reflect that the user has shared the social handle. However, when social handles are harvested from a third party, such information is typically not visible to the user.

Content item receiving and storing module 220 can receive content items from social listening devices or services such as listening integration system 135. Each content item is associated with the social handle, identifying the person who posted the content item. The content items can be obtained in real time or near real time. When the content items are received by content item receiving and storing module 220, content item receiving and storing module 220 can store the content items in a database for social handle mapping. In some embodiments, each content item is assigned and/or tagged with an article identifier, which can be used for tracking the content item and how it is used (if at all).

Mapping module 225 can map users or potential users of a service or product to content items. Each user or potential user can be associated with a user identifier as well as the social handle(s) identified by social handle obtaining module 215. Mapping module 225 can map each of the content items with a corresponding user identifier using the social handle associated with the content items. In most circumstances, not every content item will be matched with a user identifier. The content items that are mapped to a user identifier can be saved in a database along with a link to the content item.

Filtering module 230 can create a subset of the content items by selecting the content items that correspond to an event. Events can include, for example, a potential purchase, a change in marital status, having a child, relocating, changing jobs, the passing of a family member. The events can be identified by a taxonomy of words and phrases, and/or images. To determine whether each of the content items correspond to an event, filtering module 230 can analyze the content of each content item (e.g., the content item corresponds to an event of purchasing a vehicle if the content item contains the word "car" and "looking"; the content item corresponds to an event of a potential property and casualty claim if the content item contains the words "flooded"). Typically, not all content items will be associated with events. Filtering module 230 can filter all the content items or just the content items that are mapped to a user identifier.

Categorizing module 235 can categorize the content items based on the event identified from the content in the content items. Categories can include categories such as moving, automobile, insurance, or banking. The content items can be stored in files with each file storing content items associated with a certain category. After event detection, categorized data is tagged as a pre-lead. After being tagged, leads determination takes place and the data is forwarded to the leads database.

Categorizing module 235 can store, in a database, a content item reference to content items that are mapped, filtered, and categorized. The content item reference can include, for example, the article identifier, a user identifier, a link to the content, the category of the content item, a date the content item was posted, the source, the category of the event, the content item itself, and/or where the content items was posted. The content item reference can be stored with other user information (e.g., products or services the user has recently purchased, searches performed on a mobile application, browsing history, or calls or chats to the organization) to determine whether the content item is a lead that requires follow-up (e.g., call to the user, email to the user, communication on a web portal). The article identifier can be the same article identifier that was assigned when the content item was received by content item receiving and storing module 220.

Lead determination module 240 determines whether the referenced content items are leads. A lead can be considered information that could lead to additional business or services for user or potential users. For example, leads can be opportunities to assist a user (e.g., the user has property damage from a storm; the organization can assist by sending an adjustor, helping the user fill out a claim form, or calling the user to see how the organization can help) or leads can be opportunities to market a product or service to a user (e.g., the user is purchasing a house; the user likely will need home insurance). Determining whether a content item is a lead may be based on the content of the content item, the event, the source of the content item, other information regarding the user (e.g., did the user recently search on the mobile application for information about automobile insurance), and the user's account (e.g., does the user already have automobile insurance). Lead detection is based on the identification of an individual's public social identity paired with the keywords associated with an event.

Scoring module 245 can score the leads according to a set of enterprise logic or rules, and such scores can be used to determine what action should be taken, if any. The scores can be calculated based on the particular content in the lead, content of other leads, recent actions by the user (e.g., recent purchases or cancellations) or by the organization (e.g., timing or content of past communications), current products or services provided to the user, and other information. If the score is above a certain level, then scoring module 245 communicates with routing module 250 to route the lead to take an action. If the score is below a certain level, then scoring module 245 does not route the lead to routing module 250. The score can be updated over time. For example, if the user posts a certain number of times about the user's vehicle being serviced within a certain period of time, scoring module 245 can route a lead to routing module 250 to offer the user assistance with purchasing a vehicle. Thus, it may take several posts (or a combination of posts and other information) for the score to be raised to the level that an action to be taken. In some embodiments, the score can be a confidence level that the user is having an event and/or would benefit from a service or product or otherwise needs assistance. In some embodiments, the score can be a marketing funnel score. For example, the combination of multiple events in during a certain period of time can place the lead deeper in the funnel raising the likelihood that the lead is stronger and more likely to be acted upon than other leads.

Routing module 250 can route the lead to the correct channel for action if an action should be taken. Actions that can be taken include adding widgets to a website portal after the user has logged on or when the user accesses the website (e.g., "Tips for Smart Home Buying," "Mortgage Interest Rates"), sending an email or direct mail with information regarding the event, calling the user regarding the event, providing information about the event to the user after the user calls in regarding an unrelated event or issue, or bundling products or services for the user. Moreover, the score may determine the action that is taken on the lead. For example, routing module 250 may route leads with higher scores to a call center so the user can be called about the lead whereas leads with lower scores may be routed to a server such that an email is automatically sent regarding the lead.

Effectiveness module 255 can determine how effective the content item was in obtaining new business or assisting users. To do so, the article identifier can be used. For example, if a call is made based on a lead from a content item, the article identifier of the content item is logged as the reason for making the call. If the customer subsequently (e.g., within a certain period of time) purchases a product or service relating to the content item, then the process for generating and using the content item to generate a lead can be considered effective. In some embodiments, various effectiveness scores can be calculated depending upon how quickly a purchase was made and how many interactions took place before the purchase.

GUI generation module 260 is capable of generating one or more GUI screens that allow interaction with a user. In at least one embodiment, GUI generation module 260 generates a graphical user interface that receives information from and/or conveys information to the user. For example, GUI generation module 260 can display a banner providing deals or information on automobile insurance. In some embodiments, GUI generation module 260 can provide information regarding events associated with a user on the screen of a representative to use while the representative is speaking with the user.

Figure 3:
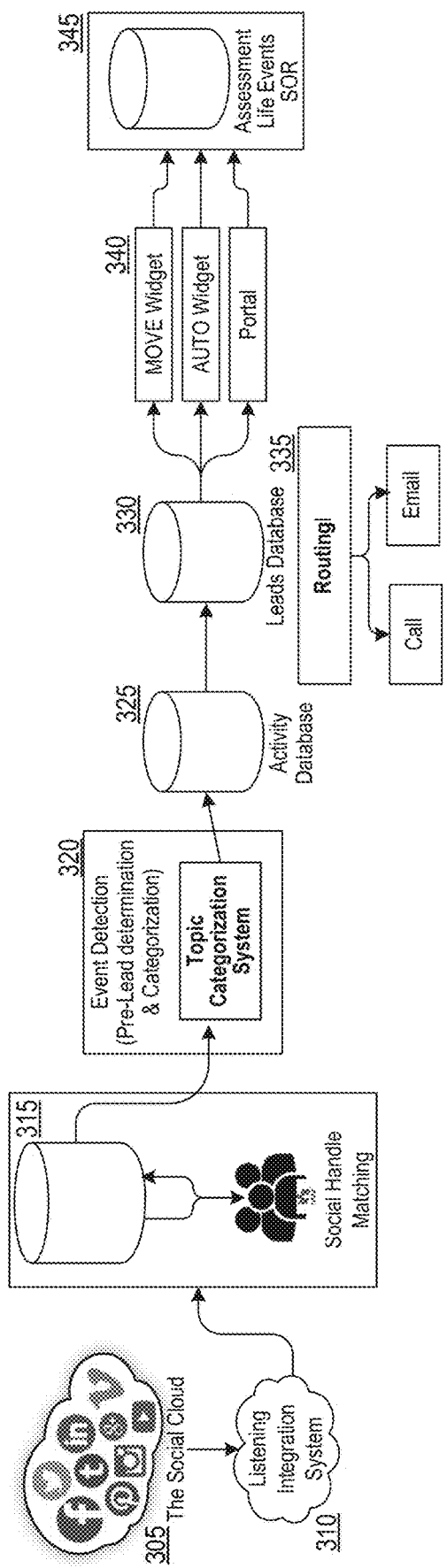
FIG. 3 is a diagram illustrating components and a process for generating and using content item leads in accordance with one or more embodiments of the present disclosure.
Figure 4:
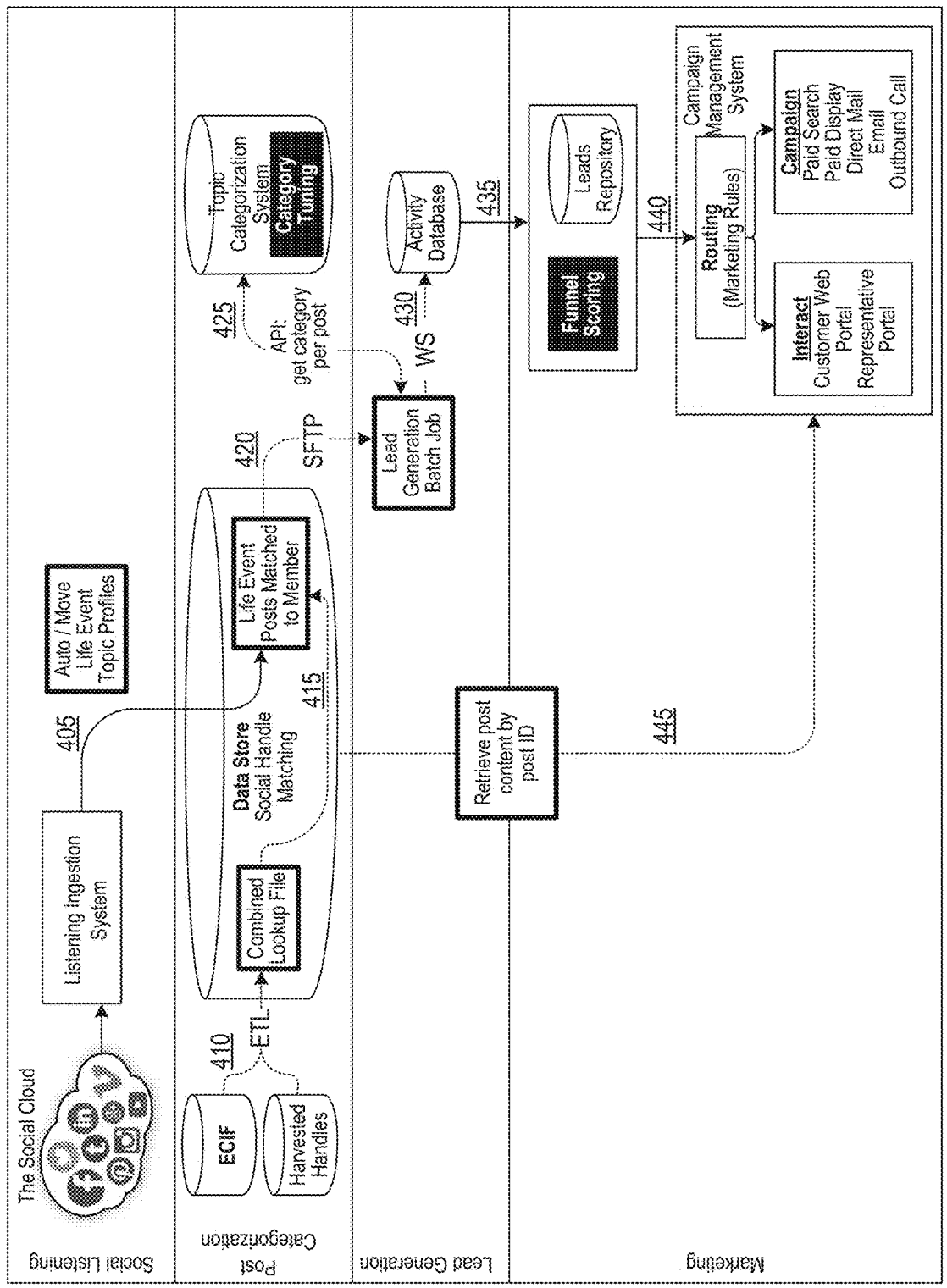
FIG. 4 is a swim lane diagram illustrating a process for generating and using content item leads in accordance with one or more embodiments of the present disclosure.
Figure 5:
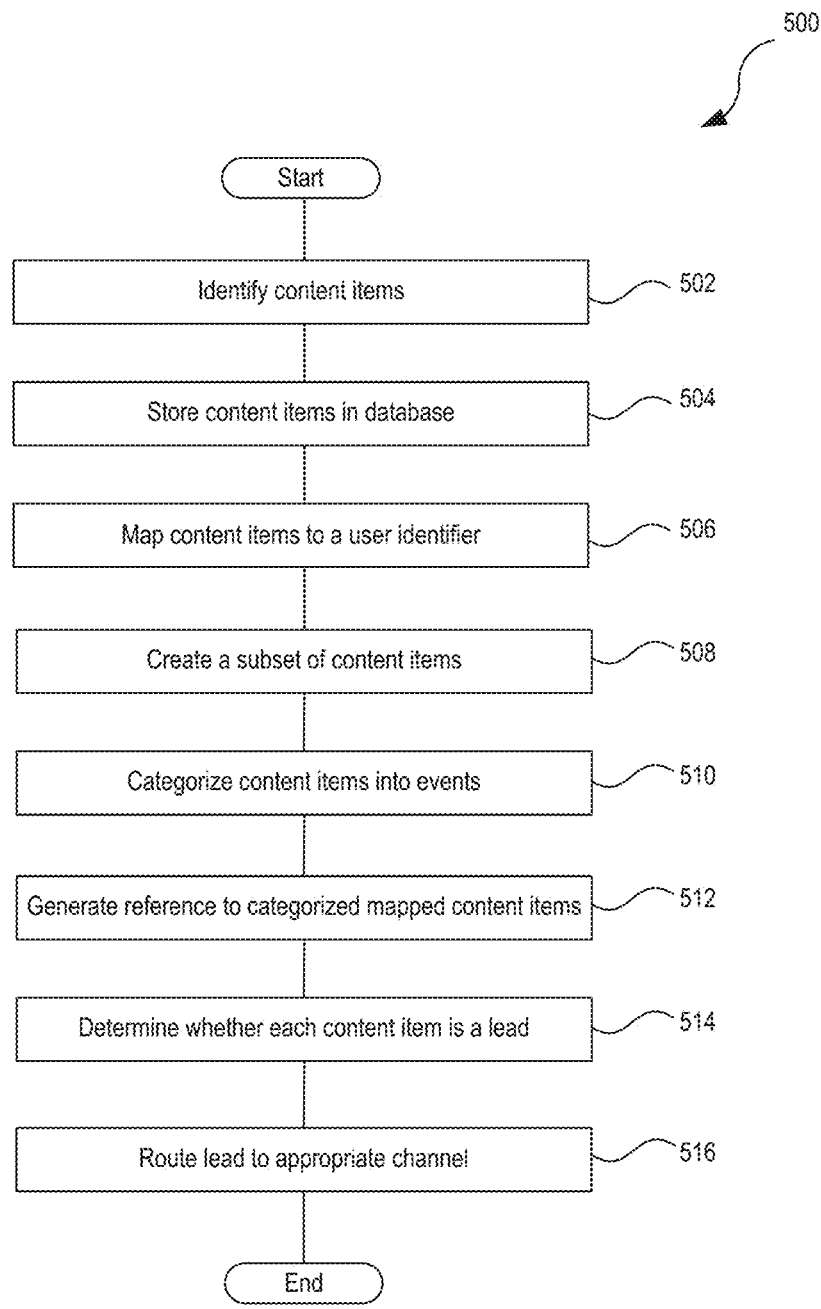
FIG. 5 is a flowchart illustrating a set of operations for generating and using content item leads in accordance with various embodiments of the present disclosure.

FIGS. 3-5 are diagrams illustrating processes for identifying, generating, and using content items leads. In some embodiments, fewer than all of the operations in each set of operations are performed, whereas in other embodiments additional operations are performed. Moreover, in some embodiments, the operations may be performed in different orders or in parallel. The operations can be performed by various components of the system such as the system illustrated in FIG. 1 and content item leads platform 120, as illustrated in FIG. 2.

FIG. 3 is a diagram illustrating components and a process for generating and using content item leads. Users create content items (e.g., posts, comments) that are stored in the social cloud (305). Listening ingestion systems or vendors collect the content items (310). The content items are stored in a data store and are matched to user identifiers based on social handles (315). Each content item is associated with a user's social handle and user identifiers are associated with the social handles. The content of the content items is then analyzed by a topic categorization system to determine whether the content item is related to an event, and, if the content item is related to an event, what category of event (320).

References to the content items that are related to an event are stored in an activity database (325). A reference to a content item can include an article identifier, a user identifier, the event, the category of event, and where it was posted. Other information regarding the user can be stored in the activity database and associated with the user (e.g., browsing history, subject of interactions with organization). Each of the content item references can be analyzed in combination with other leads and/or information to determine whether the content item is a lead and what action, if any, should be taken. When the content item is determined to be a lead, the leads database stores a record of which content item is used for what marketing or service action (330). The content items can be used to call, email, place widgets regarding categories such as "move" or "auto" on the user's portal, change the user's portal, or otherwise interact with the user regarding a product or service related the user's event (340). After contacting the user, the effectiveness of the lead is determined (e.g., did the user purchase a product or service) (345).

FIG. 4 is a swim lane diagram illustrating a process for generating and using content item leads. Content items are collected from the social cloud and sent to a listening ingestion system to be matched with a user identifier using social handles (405). Each content item can be given an article identifier. Social handles for users of a service or product can be collected and put into a lookup file (410). The content items can be matched with the social handles of the users where applicable (415). The matched content items can be processed in a lead generation batch job to determine whether the content items may be leads (420). To determine whether the content items are leads, the content items can be analyzed to determine whether they relate to an event identified by the organization and categorized into specific events by a topic categorization system (425). References to content items identified as potentially being leads can be stored in the activity database (430). The reference can include an article identifier, the event, the category of the event, a link to the event, user identifier, and a date. The content item reference can be analyzed in connection with other leads or information and scored (435). Action can be taken in accordance with marketing rules (e.g., call the user, email, provide messages on their mobile application or web portal) (440). In some embodiments, article identifiers can be used to retrieve the actual content from the content item (445).

FIG. 5 is a flowchart illustrating sets of operations 500 for assisting a user using a conversational virtual assistant. Identifying operation 502 identifies content items from a social listening device. Each content item can be tagged with an article identifier. Additionally, each content item can be associated with a social handle. Storing operation 504 stores the content items in a database. Mapping operation 506 maps the content items to a user identifier using social handles associated with the user and associated with the content items. Creating operation 508 creates a subset of content items based on content within the content items. Categorizing operation 510 categorizes the content items into events. Generating operation 512 generates a reference to the content item which can include a user identifier, a link to the content item, a category of the event, and an article identifier and stores the reference. Determining operation 514 determines whether the content item is a lead and whether an action should be taken upon the lead. The determination can be made based on a set of rules. Routing operation 516 routes the lead to an appropriate channel to take action (e.g., automatically send a letter or email, send to a representative to place a call, or update a user's web portal).

Computer System Overview

Figure 6:
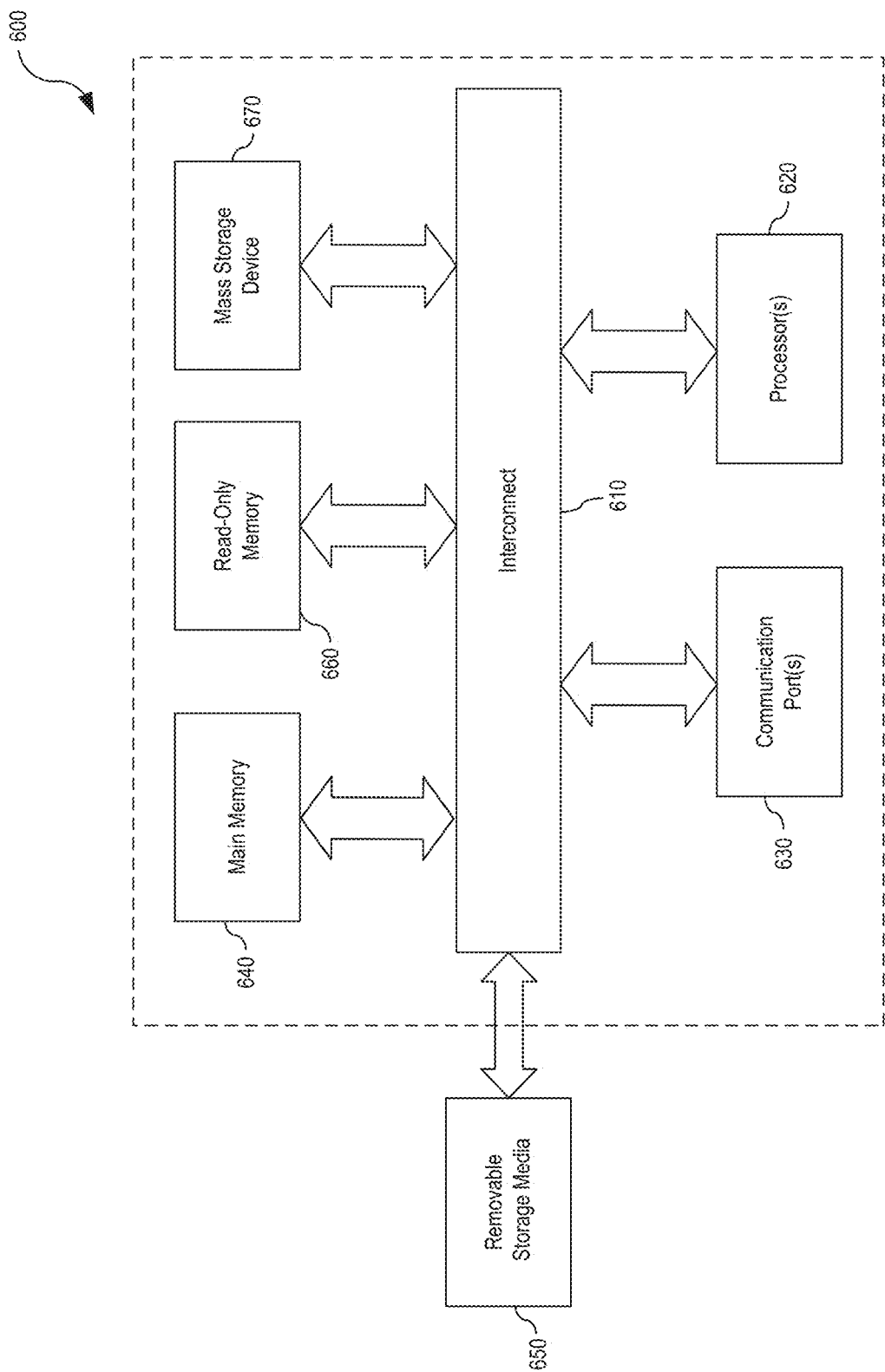
FIG. 6 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may in turn be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present disclosure may be utilized. According to the present example, the computer system 600 includes an interconnect 610, at least one processor 620, at least one communication port 630, a main memory 640, a removable storage media 650, a read-only memory 660, and a mass storage device 670.

Processor(s) 620 can be any known processor, such as, but not limited to, an Intel® Itanium® or Itanium 2® processor(s), or AMD® Opteron® or Athlon MP® processor(s), or Motorola® lines of processors. Communication port(s) 630 can be a RS-232 port for use with a modem-based dial-up connection, a 10/100 Ethernet port, or a Gigabit port using copper or fiber. Communication port(s) 630 may be chosen depending on the type of network such as a Local Area Network (LAN), Wide Area Network (WAN), or any network to which the computer system 600 connects.

Main memory 640 can be random access memory (RAM) or any other dynamic storage device(s) commonly known in the art. Read-only memory 660 can be any static storage device(s), such as programmable read-only memory (PROM) chips for storing static information, or instructions for processor(s) 620.

Mass storage device 670 can be used to store information and instructions. Mass storage devices that may be used include hard disks such as the Adaptec® family of SCSI (small computer system interface) drives, optical discs, an array of discs such as RAID (redundant array of independent disks), the Adaptec® family of RAID drives, or any other mass storage device.

Interconnect 610 communicatively couples processor(s) 620 with the other memory, storage, and communication blocks. Depending on the storage devices used, interconnect 610 can be a PCI/PCI-X- or SCSI-based system bus.

Removable storage media 650 can be any type of external hard drive, floppy drive, IOMEGA® Zip Drives, compact disc read-only memory (CD-ROM), compact disc re-writable (CD-RW), and/or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which a connection or a coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" encompasses being completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as small as several personal computers on a local area network (LAN) or as large as the Internet, a worldwide network of computers. As used herein, "network" is intended to encompass any network capable of transmitting information from one entity to another. In some cases, a network may comprise multiple networks—even multiple heterogeneous networks—such as one or more border networks, voice networks, broadband networks, financial networks, service provider networks, Internet service provider (ISP) networks, and/or public switched telephone networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. More importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead, are meant to be examples. Other systems, devices, and networks to which embodiments of the present disclosure are applicable include, but are not limited to, other types of communication and computer devices and systems. More specifically, embodiments are applicable to communication systems, services, and devices, such as cell phone networks and compatible devices. In addition, embodiments are applicable to all levels of computing, from personal computers to large network mainframes and servers.

In conclusion, the present disclosure discloses novel systems, methods, and arrangements for generating and using content item leads. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments that have different combinations of features and embodiments that do not include all of the described features. Accordingly, the scope of the present disclosure is intended to embrace all such alternatives, modifications, and variations that fall within the scope of the claims, together with all equivalents thereof. Therefore, the above description should not be taken as limiting.

What is claimed is:

1. A computerized method comprising:
   identifying, by at least one processor of a computer, content items from items posted by a plurality of users, wherein each of the content items is associated with a social handle of a user from the plurality of users;
   categorizing, by the at least one processor of the computer, each of the content items based on it corresponding to one or more events;
   filtering the content items to determine a subset of content items that are mapped to the user;
   identifying, by the at least one processor of the computer, one or more leads from the subset of content items;
   determining, by the at least one processor of the computer, a score for each of the one or more leads based on a number of times the content items associated with products or services were posted in a threshold of time by the user;
   determining, by the at least one processor of the computer, a type of follow-up communication regarding the products or services based on A) the score for each of the one or more leads and B) at least one product the user currently possesses;
   in response to determining the type of follow-up communication, routing the one or more leads to a channel for the follow-up communication based on the type of follow-up communication;
   adding one or more widgets to a web portal or mobile application associated with the channel based on the one or more leads, wherein the one or more widgets are configured to allow interaction with the user regarding a product or a service related to the one or more leads;
   receiving, from the user, a purchase relating to at least one of the one or more leads; and
   determining, by the at least one processor of the computer, an effectiveness score of the at least one of the one or more leads based on a number of interactions between the identification of the at least one of the one or more leads and a time before receiving the purchase relating to the at least one of the one or more leads.

2. The computerized method of claim 1, further comprising:
   obtaining the social handle for the user of a service or product, wherein the identified content items are associated with the obtained social handle.

3. The computerized method of claim 1, further comprising:
   generating a reference to the categorized content items, wherein the reference is stored in a database, and wherein the reference includes a user identifier and a link to the content items of the categorized content items.

4. The computerized method of claim 3,
   wherein identifying, from a social media monitoring device, the content items from items posted by the plurality of users further comprises tagging each of the content items with an article identifier, and
   wherein the reference further comprises the article identifier.

5. The computerized method of claim 1, wherein the one or more leads are an opportunity to provide a service or product to the user.

6. The computerized method of claim 1, wherein the one or more events comprise at least one of: a relocation, a potential purchase, a birth of a child, or a change in employer.

7. The computerized method of claim 1, wherein a portion of the content items are matched with a user identifier.

8. A non-transitory computer-readable medium storing instructions that, when executed by a computing system, cause the computing system to perform operations comprising:
   identifying, by at least one processor of a computer, content items from items posted by a plurality of users, wherein each of the content items is associated with a social handle of a user from the plurality of users;
   categorizing, by the at least one processor of the computer, each of the content items based on it corresponding to one or more events;
   filtering the content items to determine a subset of content items that are mapped to the user;
   identifying, by the at least one processor of the computer, one or more leads from the subset of content items;
   determining, by the at least one processor of the computer, a score for each of the one or more leads based on a number of times the content items associated with products or services were posted in a threshold of time by the user;
   determining, by the at least one processor of the computer, a type of follow-up communication regarding the products or services based on A) the score for each of the one or more leads and B) at least one product the user currently possesses;
   in response to determining the type of follow-up communication, routing the one or more leads to a channel for the follow-up communication based on the type of follow-up communication;
   adding one or more widgets to a web portal or mobile application associated with the channel based on the one or more leads, wherein the one or more widgets are configured to allow interaction with the user regarding a product or a service related to the one or more leads;
   receiving, from the user, a purchase relating to at least one of the one or more leads; and determining, by the at least one processor of the computer, an effectiveness score of the at least one of the one or more leads based on a number of interactions between the identification of the at least one of the one or more leads and a time before receiving the purchase relating to the at least one of the one or more leads.

9. The non-transitory computer-readable medium of claim 8, wherein the operations further comprise:
obtaining the social handle for the user of a service or product, wherein the identified content items are associated with the obtained social handle.

10. The non-transitory computer-readable medium of claim 8, wherein the operations further comprise:
generating a reference to the categorized content items, wherein the reference is stored in a database, and wherein the reference includes a user identifier and a link to the content items of the categorized content items.

11. The non-transitory computer-readable medium of claim 10,
wherein identifying, from a social media monitoring device, the content items from items posted by the plurality of users further comprises tagging each of the content items with an article identifier, and
wherein the reference further comprises the article identifier.

12. The non-transitory computer-readable medium of claim 8, wherein the one or more leads are an opportunity to provide a service or product to the user.

13. The non-transitory computer-readable medium of claim 8, wherein the one or more events comprise at least one of: a relocation, a potential purchase, a birth of a child, or a change in employer.

14. The non-transitory computer-readable medium of claim 8, wherein a portion of the content items are matched with a user identifier.

15. A system comprising:
one or more processors; and
one or more memories storing instructions that, when executed by the one or more processors, cause the system to perform a process comprising:
identifying, by at least one processor of a computer, content items from items posted by a plurality of users, wherein each of the content items is associated with a social handle of a user from the plurality of users;
categorizing, by the at least one processor of the computer, each of the content items based on it corresponding to one or more events;
filtering the content items to determine a subset of content items that are mapped to the user;
identifying, by the at least one processor of the computer, one or more leads from the subset of content items;
determining, by the at least one processor of the computer, a score for each of the one or more leads based on a number of times the content items associated with products or services were posted in a threshold of time by the user;
determining, by the at least one processor of the computer, a type of follow-up communication regarding the products or services based on A) the score for each of the one or more leads and B) at least one product the user currently possesses;
in response to determining the type of follow-up communication, routing the one or more leads to a channel for the follow-up communication based on the type of follow-up communication;
adding one or more widgets to a web portal or mobile application associated with the channel based on the one or more leads, wherein the one or more widgets are configured to allow interaction with the user regarding a product or a service related to the one or more leads;
receiving, from the user, a purchase relating to at least one of the one or more leads; and
determining, by the at least one processor of the computer, an effectiveness score of the at least one of the one or more leads based on a number of interactions between the identification of the at least one of the one or more leads and a time before receiving the purchase relating to the at least one of the one or more leads.

16. The system according to claim 15, wherein the process further comprises:
obtaining the social handle for the user of a service or product, wherein the identified content items are associated with the obtained social handle.

17. The system according to claim 15, wherein the process further comprises:
generating a reference to the categorized content items, wherein the reference is stored in a database, and wherein the reference includes a user identifier and a link to the content items of the categorized content items.

18. The system according to claim 17,
wherein identifying, from a social media monitoring device, the content items from items posted by the plurality of users further comprises tagging each of the content items with an article identifier, and
wherein the reference further comprises the article identifier.

19. The system according to claim 15, wherein the one or more leads are an opportunity to provide a service or product to the user.

20. The system according to claim 15,
wherein the one or more events comprise at least one of: a relocation, a potential purchase, a birth of a child, or a change in employer, and
wherein a portion of the content items are matched with a user identifier.

* * * * *